United States Patent [19]

Ireland

[11] 4,387,616
[45] Jun. 14, 1983

[54] SHEET METAL SHEAR

[75] Inventor: Ralph Ireland, Mankato, Minn.

[73] Assignee: Dayton Rogers Manufacturing Co., Minneapolis, Minn.

[21] Appl. No.: 222,595

[22] Filed: Jan. 5, 1981

[51] Int. Cl.³ .................... B23D 17/08; B23D 23/00
[52] U.S. Cl. ..................................... 83/608; 83/696; 83/700
[58] Field of Search .................. 83/607–609, 83/696, 694, 700, 465, 466

[56] References Cited

U.S. PATENT DOCUMENTS

| | | | |
|---|---|---|---|
| 1,044,966 | 11/1912 | Adams et al. | 83/607 |
| 1,112,076 | 9/1914 | McGorvin | 83/607 |
| 2,219,602 | 10/1940 | Rayner | 83/607 |
| 2,582,933 | 1/1952 | Nielson | 83/607 |

FOREIGN PATENT DOCUMENTS 273249  8/1964  Australia ........................... 83/607

Primary Examiner—Frank T. Yost
Attorney, Agent, or Firm—Peterson, Palmatier, Sturm, Sjoquist & Baker, Ltd.

[57] ABSTRACT

A cutter for ribbed sheet metal building panels wherein anvil blocks are mounted on the base table adjacent the shear edge of the base table which normally cooperates with the cutting edge of the swinging shear blade. The anvil blocks define sharp cornered oblique cutting edges shaped according to the shape of the ribs of the sheet metal panel; and the anvil blocks have obliquely oriented fore and aft sides to prevent interfering with the ribs when the sheet metal panels are obliquely oriented with respect to the shearing edge of the base table.

15 Claims, 6 Drawing Figures

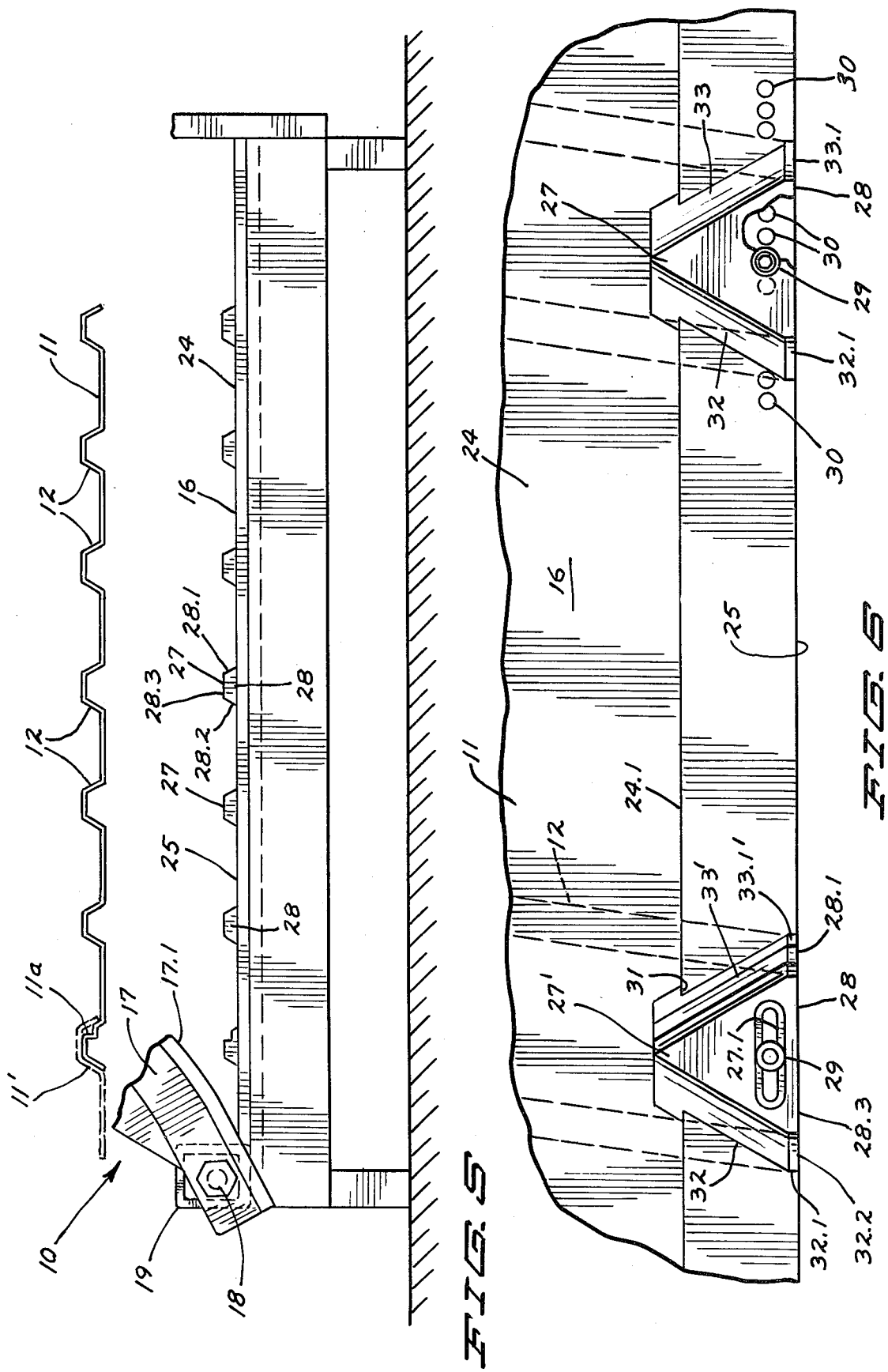

SHEET METAL SHEAR

This invention relates to a cutter for ribbed sheet metal building panels.

Ribbed sheet metal building panels are oftentimes used as the outer skin of pole buildings and other similar structures. Such sheet metal building panels are ribbed for strength and decorative effects. Although the building panels may vary considerably in size, such panels are typically thirty-eight inches wide and are formed of twenty-six to twenty-nine gauge steel. When such building panels are used in the sidewalls of buildings, the panels are oriented in upright position, and one edge of each panel overlaps an adjacent panel. On certain sidewalls of a building, the sheet metal building panels must be cut square or perpendicular to their length. When the building panels are used at the gable ends of the building, the ends of the sheet metal panels must be cut at an oblique angle to conform to the pitch of the roof. Pitch of building roofs may vary considerably but typically the pitch may be three inches vertical to twelve inches horizontal, or two inches vertical to twelve inches horizontal, or one inch vertical to twelve inches horizontal.

The sheet metal building panels are supplied from the mill with their ends cut square; and generally in standard lengths.

If the length of the building panels must be adjusted to fit, the panels must be cut at the building side. The oblique ends of the building panels must always be cut at the building site in order to fit them to the pitch of the roof.

In the past, cutters of sheet metal building panels have been known, but such cutters have been completely lacking of versatility, and accordingly have been cumbersome to use and the construction of the buildings have been unnecessarily delayed.

SUMMARY OF THE INVENTION

An object of the invention is to produce a new and improved cutter for ribbed sheet metal building panels, of simple and inexpensive construction and operation.

Another object of the invention is to produce a novel cutter for ribbed sheet metal building panels which will facilitate cutting either right-hand or left-hand slopes across the ends of such panels and without deforming the sheet metal during cutting.

Still another object of the invention is to produce an improved cutter which will make cuts across the ends of ribbed sheet metal panels in directions perpendicular to the length of the panels and at various oblique angles.

An important feature of the invention is a multiplicity of stationary anvil blocks with shear edges on and spaced along the base table and adjacent the shear edge thereof to cooperate with the swinging shear blade to cut the ribbed sheet metal building panels. The ribs of such panels nest onto the anvil blocks to be cut by the blade during downward swinging thereof.

The front faces of the anvil blocks are flush with the shear edge of the table, and the shear edges of the blocks are at the peripheries of such front faces.

The fore and aft side faces of the blocks, which lie transversely to the front faces, are oriented at oblique acute angles with respect to the front faces and void interference with the sides of the ribs in the sheet metal as the length of the sheet metal is oriented at various oblique angle with respect to the shear edge of the base table.

Preferably, the fore and aft side faces of the blocks have narrow, band or strip-like areas which adjoin and parallel the shear edges and which are oriented normal to the front faces. These narrow areas of the side faces of the blocks assure localized support for the sheet metal in the ribbed areas of the panels to avoid possible deformation of the panels during cutting.

The anvil blocks are detachably secured to the base table by machine screws anchored in any of the multiplicity of tapped apertures in the table. The blocks may be variously located to accommodate the spacings between the ribs in the panels, thereby facilitating cutting various types of panels on the cutter and also cutting transversely across the width of the various panels at their various oblique angles. It will be recognized that as the oblique angle of the cut be made across a panel is changed, the spacing between the ribs will similarly be changed at the location of the cut. Such panels are used for building sidewalls, may be cut for either left-hand slopes or right-hand slopes.

The cutter according to the invention obtains the advantage of substantial versatility in cutting ribbed sheet metal building panels at the building site. Only one such cutter is required and it may be adjusted to accommodate square or oblique cuts in either direction. The shear edges on the blocks form a continuation of the shear edges on the base table to produce smoothly cut edges on the sheet metal panels.

The relief afforded by the obliquely oriented fore and aft side faces of the blocks prevents undesired deformation of the ribs during cutting when the length of the metal panel is oriented obliquely of the shear edge of the base table.

The anvil blocks are the most important feature of the shear as they allow significant versatility in use of the one shear in multiplicity of operations. This simple machine will perform such tasks as cutting flat stock or ribbed steel of any style that anvil blocks are designed for, and cutting angle cuts with the same anvil blocks because of the unique design of anvil blocks an anvil bar that allows the spacing of anvil blocks and the turning thereof. The shear with the unique anvil blocks allows positioning of the metal sheets on the cutting bar and anvil blocks to orientation for other than for a 90° cut. Also this feature allows the user to use the same machine for cutting steel manufactured by different companies and in different configurations by merely changing the anvil blocks and bar rather than by substituting a complete machine or blade thereof.

BRIEF DESCRIPTION OF THE DRAWINGS

FIG. 5 is an enlarged detail elevation of the cutter as viewed from the side opposite to that seen in FIG. 1 and showing a ribbed sheet metal building panel to be laid upon the base table.

FIG. 6 is a greatly enlarged detail plan view of a portion of the base table of the cutter and illustrating two of the anvil blocks, portions of one being broken away for clarity of detail.

DETAILED SPECIFICATION

Figure 4:
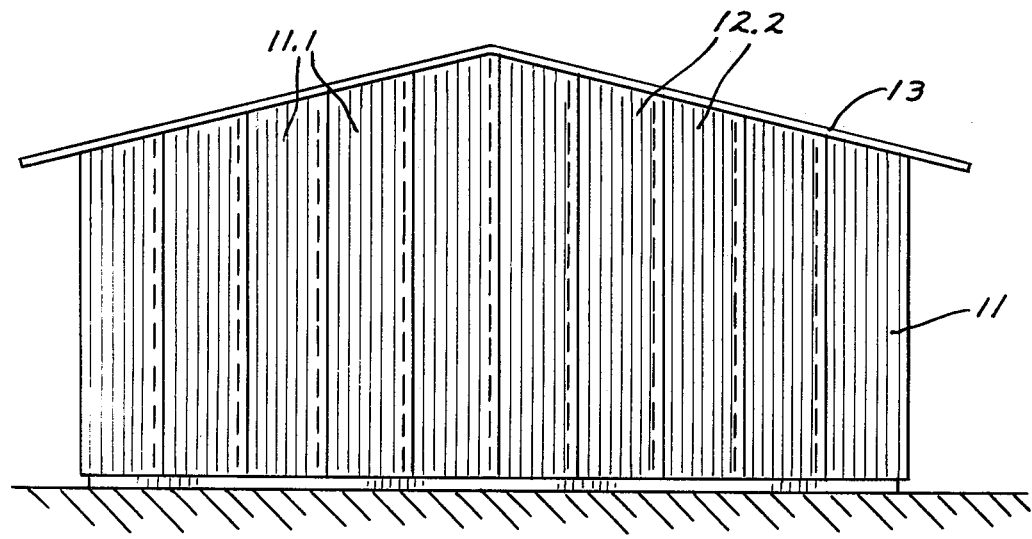
FIG. 4 is a diagrammatic sketch illustrating a building utilizing such ribbed building panels in the sidewall thereof.

One form of the invention is illustrated in the drawings and is described herein. The cutter is indicated in general by numeral 10 and is for the purpose of cutting sheet metal building panels 11 which, as illustrated in FIG. 4 are commonly used as the outer skin or sheath of a building B. When installed, panels 11 will extend entirely from the ground level to the roof structure of the building. A typical sheet metal building panel as illustrated in end elevation in FIG. 5 will have a multiplicity of ribs 12 formed therein. The particular panels 11 illustrated in the drawings have seven ribs, which are on approximately six inch centers; but other commonly used building panels may have the ribs spaced a foot apart; or in some cases the ribs may be closer together than those illustrated. The panels 11 may be in various lengths up to twenty or twenty-five feet or more.

When the building panels 11 are installed in a building, the side edges are lapped; and a typical arrangement is illustrated in FIG. 5 wherein the panel 11' shown in dotted lines has one of its edges lapped over the edge rib of the adjacent panel. Some building panels are provided with a recess or groove 11a in a rib at one edge which is to underlie the adjacent panel. The recess or groove 11a is for the purpose of providing a space for rainwater to run downwardly to the ground and thereby prevent migration of rainwater into the wall structure of the building.

It is recognized that certain types of anvils or sheet metal building panels 11 may be minutely embossed in the flat areas between the ribs 12 to provide a decorative effect. These embossed areas do not present any problem in cutting across the width of the panels and for all practical purposes may be ignored.

The cutter 10 has frame structures 14 to support the cutter and facilitate mounting the cutter on a temporary rigid structure at the building site. A rigid inverted steel channel 15 provides a base table 16 for the cutter. The edges of the depending flanges of the channel are affixed as by welding to the frame structure 14.

A swingable cutter blade 17 may be swingably mounted to the table 16 in any of a number of ways, but as illustrated in the drawing, a threaded stud 18 extends through an aperture in the blade 17, and is affixed to a rigid steel box channel 19 which is affixed to the base table as by bolts 20. The location of the box channel 19 and of the blade 17 is regulated by a threaded stud 21 extending through an aperture in an upright rigid steel frame part 22 welded to the side of the channel flange 15; and a nut 23 on the threaded stud accurately controls the positioning of the box channel 19 and the swinging blade 17 relative to the base table. A nut 18a on the threaded stud 18 retains the swinging blade in predetermined position thereof.

The base table 16 includes a hardened steel rigid stationary blade 24 which extends longitudinally throughout the length of the base table and defines the shear edge 25 thereof. The stationary blade is affixed to the channel 15 by a plurality of machine screws 26. The cutting edge 17.1 of the shear blade 17 engages the shear edge 25 of the stationary blade 24 to produce cutting in a shearing type action of the sheet metal panel 11 as the blade 17 is swung downwardly by the workman gripping the handle 17.2 of the blade.

A multiplicity of anvil blocks 27 are mounted on the base table and spaced along the shear edge 25. The anvil blocks 27 are secured in overlying relation to the stationary blade 24 by machine screws 29 which extend through apertures in the block 27 and thread into any of a multiplicity of tapped apertures 30 in the shear blade 24. One such securing screw 29 is sufficient for each of the anvil blocks 27, which are maintained in proper orientation relative to the shear edge 25 by a depending shoulder surface 31 which bears against the rear edge 24.1 of the stationary blade 24. Certain of the anvil blocks 27, such as the block 27' closest to the pivot of the blade 17, may have a slot-like opening 27.1, thereby providing infinitely small adjustability of that particular anvil block relative to the securing screw 29, the head of which clamps the anvil block against the stationary blade 24; however, most of the blocks 27 will be affixed in a particular location by the attaching screw threaded into a tapped aperture in the stationary blade 24. It will be recognized that the locations of the several tapped apertures 30 are predetermined in order to accommodate the expected and desired locations of the anvil blocks, according to the expected necessary locations of the block.

The front face 28 of each of the blocks 27 lies flush with the shear edge 25 of the stationary blade 24. The front face 28 of each of the blocks has a shape approximating the transverse shape of the ribs 12 in the panel 11. The peripheral edges 28.1, 28.2 and 28.3 of the front face 28 are sharp cornered so that these edges 28.1, 28.2 and 28.3, are also shear edges to cooperate with the swinging shear blade 17 in cutting the building panels 11.

With the front faces of 28 of the several shear blocks 27 lying in the vertical plane in which the cutting edge 17.1 of the swinging shear blade moves, the cutting edge 17 of the swinging blade progressively moves along each of the shear edges 28.2, 28.3 and 28.1 in a shearing action. Accordingly, the shear edges 28.1, 28.2 and 28.3 of the several anvil blocks provide a continuation of the shear edge 25 of the base table. As the anvil blocks 27 are relocated along the base table and stationary blade 24, the shoulder surfaces 21 preposition the anvil blocks 27 so that the desired and described relationship between the shear edge 25 and the several edges 28.1, 28.2 and 28.3 will continue.

The blocks 27 also have inclined fore and aft side surfaces 32 and 33 respectively, which lie at an oblique acute angle with respect to the front faces 28 of the blocks and which also lie at oblique acute angles with respect to the top surface of the stationary blade 24. As seen in FIG. 6, the fore and aft sides surfaces converge toward each other in a direction away from the front face 28 so that the overall shape of the anvil blocks 27 is somewhat triangular, as appears in top plan.

Figure 1:
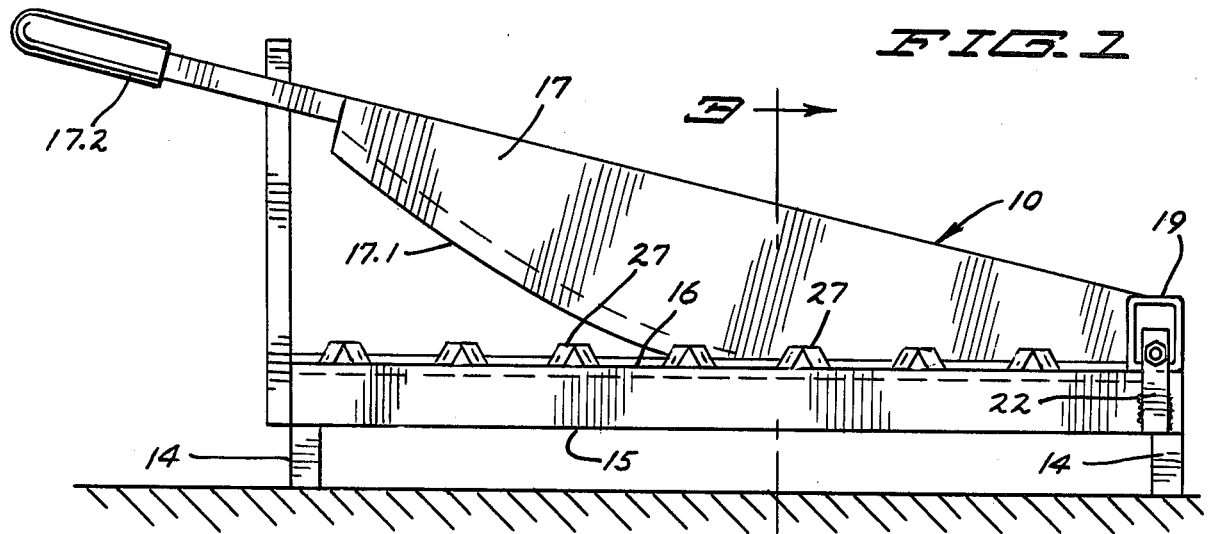
FIG. 1 is an elevation view of one side of the cutter.
Figure 2:
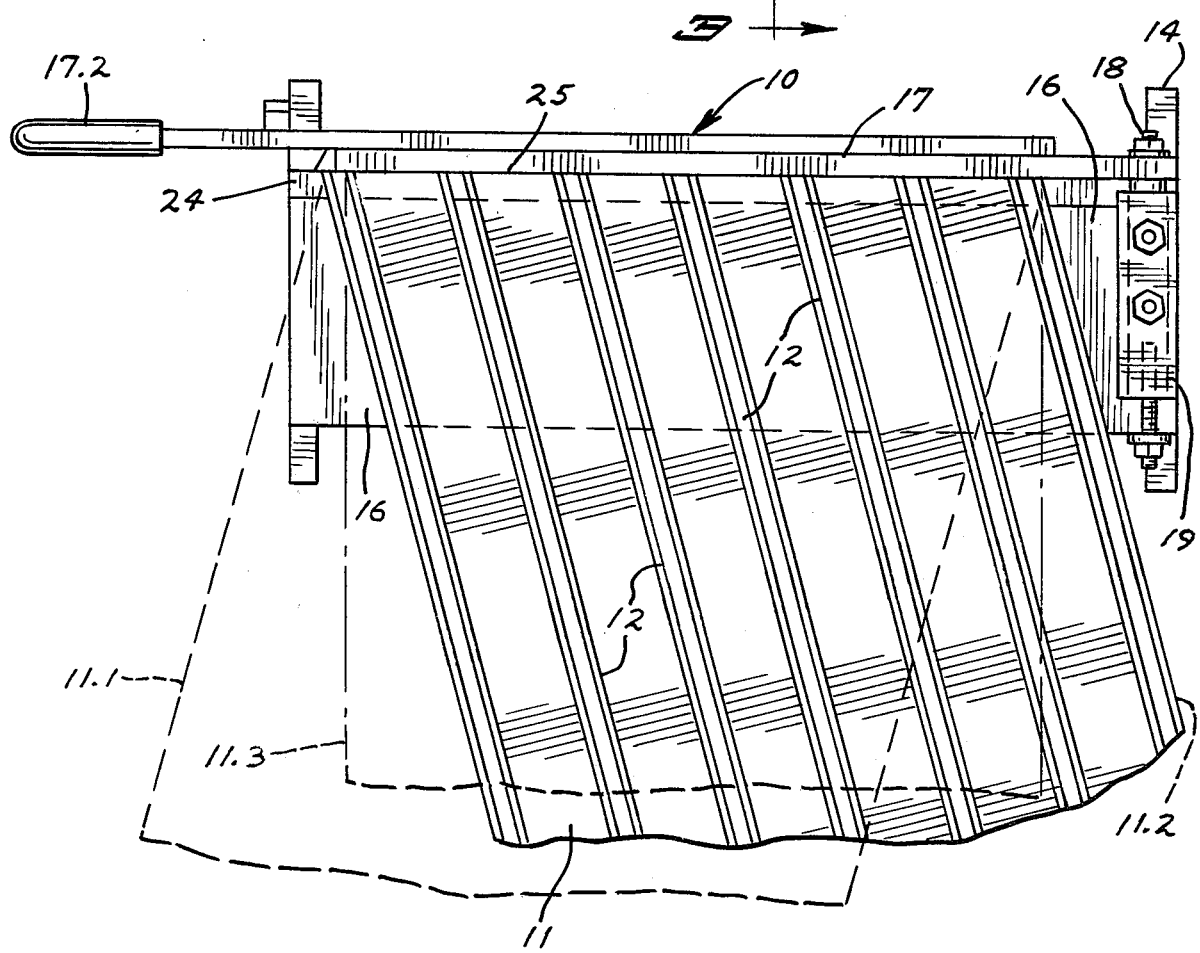
FIG. 2 is a top plan view of the cutter with a ribbed sheet metal building panel lying on the base table and being cut, and also showing in dotted lines, the sheet metal panel oriented at various angular relationships to the cutter.
Figure 3:
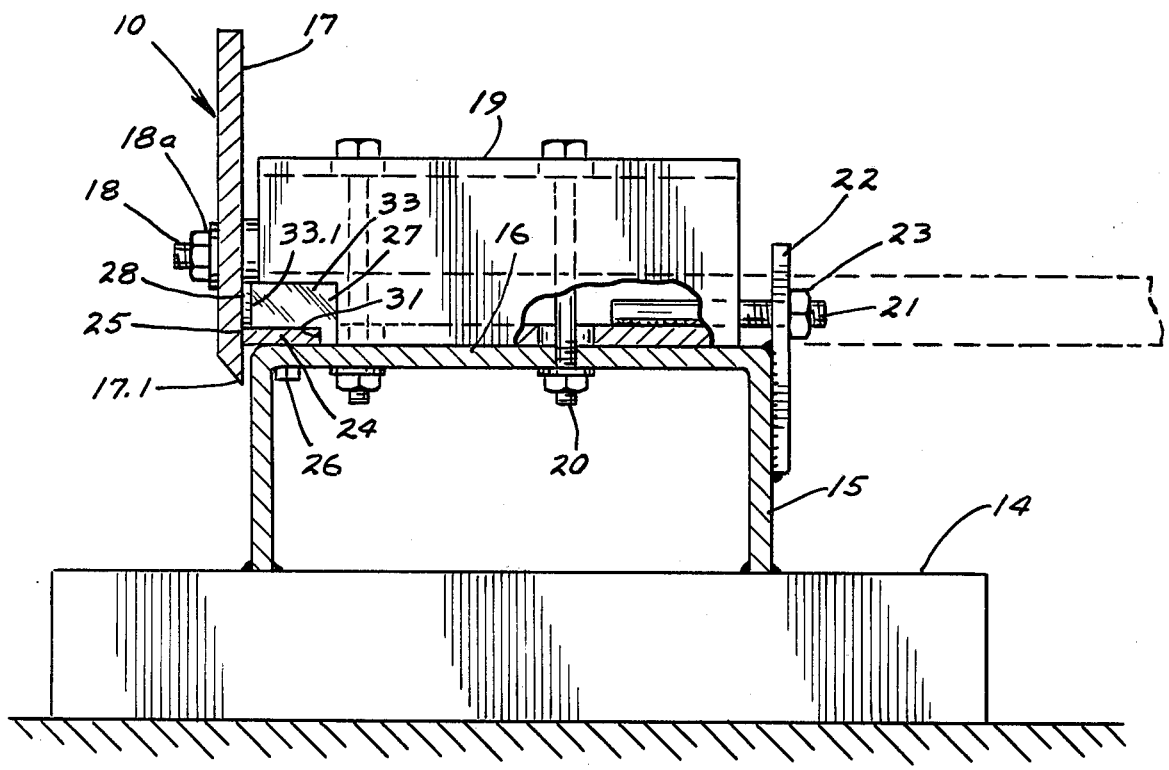
FIG. 3 is an enlarged detail section view taken approximately at 3—3 in FIG. 1.

The acute oblique relationship of the side surfaces 32 and 33 provide relief so that the side surfaces of the blocks do not engage and interfere with the ribs 12 of the panels 11 when the panels are applied onto the cutter at various oblique angles as illustrated in FIG. 2.

The fore and aft sides 32 and 33 also define narrow band or strip-like areas 32.1 and 33.1 which are oriented perpendicular to the front faces 28, but are inclined similarly to edges 28.2 and 28.1 with respect to the top face of the stationary blades 24. These strip-like areas 32.1 and 33.1 are sufficiently narrow as to be insignificant as relates to the overall width of the blocks 27 and of the ribs 12 of the panel, but the orientation of these strip-like areas 32.1 and 33.1 contribute materially to the production of clean cuts of the panels 11 without deformation, especially when the panels 11 are being cut at an oblique angle across the width, substantially in a manner illustrated in FIG. 2. In order to accommodate the grooves 11a in panels 11, the block 27 closest to the pivot 18 will have its front face 28' shaped to conform to the shape of the panel rib with recess 11a, as seen in FIG. 5. Also, the area 33.1 and side 53' are complimentarily shaped.

It will be recognized that the cutter 10 is useful, without adjustment, for producing end cuts of the panels 11 with a left-hand slope for those panels at the left-hand side of the gable roof as indicated by numeral 11.1 in FIG. 4 and also for cutting the ends of panels obliquely with a right-hand slope as illustrated with those panels indicated by numeral 11.2 in FIG. 4.

In the event that panels are being cut so that the slope of the oblique cut is to be changed, the locations of the anvil blocks along the base table 16 will need to be adjusted. It will be recognized that if the cutter 10 is being utilized for producing a square cut across the width of the panel in the manner indicated by the dotted line 11.3 of FIG. 2, the spacing of the anvil blocks 27 on the base table need to be adjusted in accordance with the spacing of the ribs. Locations of the tapped apertures 30 in the stationary blade 24 are preset in order to accommodate these various conditions.

It will be seen that the present invention provides a cutter for ribbed sheet metal building panels to accomplish cutting of the ribbed areas of these panels without deforming the sheet metal at the cut. The cutter utilizes the anvil blocks with the front faces lying flush against the shear edge of the base table so that the swinging shear blade produces cutting of the sheet metal panels along the shear edge of the base table and around the peripheral shear edges bounding the front faces of the anvil blocks. The elongate panels may be oriented at various oblique angles with respect to the cutter and all of the various angles may be cut on the cutter, providing both left-hand slopes and right-hand slopes for building panels being used at the gable end of the building. The anvil blocks are readily relocated on the cutter for cutting across the width of panels where different slopes are to be utilized. Only a single cutter 10 is needed on any construction job because all of the panels can be cut to length at the proper angle by a single cutter 10.

What is claimed is:

1. A cutter for ribbed sheet metal building panels, comprising
an elongate base table on which to lay such sheet metal panels and having a shear edge along one side thereof,
an elongate shear blade connected with the base table to move downwardly along the shear edge and cut the sheet metal panel, and
a multiplicity of cutting anvils on the base table and spaced from each other along the shear edge thereof, the anvils having front faces lying flush with the shear edge of the base table, the peripheral edges of the front faces conforming to the shape of the ribs of the sheet metal panels, the anvils also having fore and aft side faces adjoining the front faces in sharp-cornered relation whereby the peripheral edges define cutting edges for cooperating with the blade in cutting the ribbed portions of the panels, and releasable securing means anchoring the anvils on the base table.

2. The cutter according to claim 1 and the securing means between the anvils and the base table permitting incremental relocation of the anvil blocks along the shear edge of the base table.

3. The cutter according to claim 1 and the fore and aft side faces of the anvils also oriented at acute angles with respect to the top surface of the base table.

4. The cutter according to claim 1 and the fore and aft side faces including strip shaped areas adjoining said peripheral edges and lying perpendicular to the front faces and preventing deformation of the sheet metal panel and ribs during cutting.

5. The cutter according to claim 2 and the anvils having securing screws attaching to any of a multiplicity of tapped apertures in the base table.

6. The cutter according to claim 1 and one of the anvils having one side surface thereof with an angular recess therein.

7. The cutter according to claim 1 and the base table including a base plate and a hardened steel stationary blade thereon and defining said shear edge of the base table, the stationary blade also having a rear edge opposite the shear edge and extending parallel thereto, the anvils lying on the stationary blade and having locater shoulders engaging the rear edge and maintaining the anvils in predetermined orientation with respect to the shear edge of the stationary blade as the anvils are relocated on the base table.

8. The cutter according to claim 2 and the shear blade having pivot means at one end secured to the base table adjacent one end of the shear edge of the table, and the blade cutting by swinging downwardly along the shear edge.

9. A cutter for ribbed sheet metal building panels, comprising
an elongate base table on which to lay such sheet metal panel, the base table having a base plate and also having a hardened steel stationary blade affixed to the base plate and defining a shear edge extending longitudinally of the elongated base table, the stationary blade having a multiplicity of tapped apertures through the top surface of the stationary blade, and said stationary blade also having a rear edge extending longitudinally parallel to the shear edge thereof,
an elongate shear blade lying along the base table and having a pivotal connection to the base table to swing downwardly along said shear edge of the stationary blade in an overlapping and shearing relationship to cut such sheet metal panel lying on the base table,
the swinging shear blade having a substantially smoothly contoured shearing edge bearing against the shear edge of the stationary blade,
and a multiplicity of anvil blocks on the base table and spaced from each other along the shear edge of the base table, the blocks lying on the stationary blade and having locater shoulders bearing against the read edge of the stationary blade, said blocks having substantially planar front faces lying flush with the shear edge of the stationary blade, the peripheral edges of the front faces of said anvil blocks conforming to the shape of the ribs of the sheet metal panels and said peripheral edges being sharp cornered to define cutting edges cooperating with the swinging shear blade in cutting the ribbed portions of the sheet metal building panels, said anvil blocks also having fore and aft side faces lying at oblique acute angles with respect to the front faces of the blocks and also lying at oblique angles with respect to the top surface of the stationary blade, said fore and aft side faces of the anvil blocks having strip shaped areas adjoining said peripheral edges and lying perpendicular to the front faces and bearing against the ribbed portions of the sheet metal panels during the cutting to prevent deformation thereof, and the anvil blocks having securing screws attaching to any of the multiplicity of tapped apertures in the base table to accommodate the spacing between the adjacent ribs in the sheet metal panels.

10. A cutter for ribbed sheet metal building panels, comprising an elongate base table on which to lay such sheet metal panels and having a shear edge along one side thereof, an elongate shear blade connected with the base table to move downwardly along the shear edge and cut the sheet metal panel, and a multiplicity of cutting anvils on the base table and spaced from each other along the shear edge thereof, the anvils having front faces lying flush with the shear edge of the base table, the peripheral edges of the front faces conforming to the shape of the ribs of the sheet metal panels and being sharp-cornered to define cutting edges for cooperating with the blade in cutting the ribbed portions of the panels, and the anvils also having fore and aft side faces avoiding interfering with the ribs in the panel when the panel is oriented with the ribs extending obliquely to the shear edge of the base table.

11. The cutter according to claim 1 wherein said cutting anvils having narrow strip-like surfaces adjoining the peripheral edges of the front faces and oriented transversely of the front faces.

12. A cutter for elongate ribbed sheet metal building panels, comprising a panel supporting base table with one elongate side to be traversed by a panel to be cut, an elongate cutting blade connected with the base table and extending along said elongate side thereof to engage and cut through the sheet metal panel, a multiplicity of cutting anvils on the base table and spaced from each other along said elongate side thereof, the anvils having front faces with peripheral edges conforming to the shape of the ribs of the sheet metal panels and being sharp-cornered to define cutting edges, the anvils accommodating placement of the panels on the base table with the ribs extending either normal or oblique to the elongate side of the table, and means releasably securing the cutting anvils on the base table and including a stationary blade on the table and having a shear edge extending along said elongate side of the table, the cutting anvils being secured to the stationary blade with the front faces thereof lying substantially flush with the shear edge of the stationary blade, the cutting blade cooperating with the shear edge of the stationary blade and with the cutting edges of the anvils in shearing transversely across the metal panel and ribs therein.

13. A cutter according to claim 12 and clamping means securing at least one of the anvils to the stationary blade and accommodating sliding adjustment of the anvil along the stationary blade.

14. A cutter according to claim 13 and the clamping means including a screw threaded in the stationary blade and having a screw head clamping the anvil onto the blade.

15. A cutter according to claim 12 and the stationary blade also having a rear edge opposite the shear edge, and anvils having depending locater shoulders bearing against the rear edge to maintain the anvils in predetermined orientation.

* * * * *

UNITED STATES PATENT AND TRADEMARK OFFICE
CERTIFICATE OF CORRECTION

PATENT NO. : 4,387,616
DATED : June 14, 1983
INVENTOR(S) : Ralph Ireland

It is certified that error appears in the above-identified patent and that said Letters Patent are hereby corrected as shown below:

Column 1, line 29, delete "side" and substitute --site--.

Column 3, line 32, delete "anvils or".

Column 4, line 1, after "of", insert --anvils or--.

Column 6, line 61, delete "read" and substitute --rear--.

Column 1, line 67, delete "angle" and substitute --angles--.

Column 2, line 9, delete "the" and substitute --a--.

Signed and Sealed this

Sixteenth Day of August 1983

[SEAL]

Attest:

GERALD J. MOSSINGHOFF

Attesting Officer    Commissioner of Patents and Trademarks